United States Patent
Bevins, III et al.

(10) Patent No.: US 7,045,030 B2
(45) Date of Patent: May 16, 2006

(54) LIGHTWEIGHT NONWOVEN FABRIC HAVING IMPROVED PERFORMANCE

(75) Inventors: Errette Bevins, III, Mountain Top, PA (US); Sergio Diaz De Leon, Huntersville, NC (US)

(73) Assignee: Polymer Group, Inc., North Charleston, SC (US)

( * ) Notice: Subject to any disclaimer, the term of this patent is extended or adjusted under 35 U.S.C. 154(b) by 213 days.

(21) Appl. No.: 10/354,412

(22) Filed: Jan. 30, 2003

(65) Prior Publication Data

US 2004/0007323 A1    Jan. 15, 2004

Related U.S. Application Data

(60) Provisional application No. 60/353,125, filed on Feb. 1, 2002.

(51) Int. Cl.
*B32B 31/30* (2006.01)
*B32B 27/02* (2006.01)
*B32B 27/32* (2006.01)

(52) U.S. Cl. .................. 156/176; 156/179; 156/181; 264/113

(58) Field of Classification Search ............... 156/176, 156/179–181; 264/109, 112–113
See application file for complete search history.

(56) References Cited

U.S. PATENT DOCUMENTS

| | | | |
|---|---|---|---|
| 3,260,778 A | 7/1966 | Walton | |
| 3,416,192 A | 12/1968 | Packard | |
| 3,810,280 A | 5/1974 | Walton | |
| 4,029,101 A | 6/1977 | Chesky et al. | |
| 4,041,203 A | 8/1977 | Brock et al. | |
| 4,082,878 A * | 4/1978 | Boe et al. | 428/195.1 |
| 4,090,385 A | 5/1978 | Packard | |
| 4,184,498 A | 1/1980 | Franco | |
| 4,195,634 A | 4/1980 | DiSalvo et al. | |
| 4,408,357 A | 10/1983 | Toth | |
| 4,573,986 A * | 3/1986 | Minetola et al. | 604/366 |
| 4,717,329 A | 1/1988 | Packard et al. | |
| 4,784,892 A * | 11/1988 | Storey et al. | 428/172 |
| 4,845,779 A | 7/1989 | Wheeler et al. | |
| 4,876,746 A | 10/1989 | Howie | |
| 4,886,513 A | 12/1989 | Mason, Jr. et al. | |
| 5,288,544 A * | 2/1994 | Mallen et al. | 442/198 |
| 5,655,374 A | 8/1997 | Santilli et al. | |
| 5,678,379 A | 10/1997 | Quattrociocchi | |
| 5,766,737 A * | 6/1998 | Willey et al. | 428/198 |
| 5,804,512 A | 9/1998 | Lickfield et al. | |
| 5,843,056 A | 12/1998 | Good et al. | |
| 5,951,535 A * | 9/1999 | Fujiwara et al. | 604/384 |
| 6,029,274 A | 2/2000 | Welchel et al. | |
| 6,103,647 A | 8/2000 | Shultz et al. | |

(Continued)

*Primary Examiner*—Sam Chuan Yao
(74) *Attorney, Agent, or Firm*—Wood, Phillips, Katz, Clark & Mortimer

(57) ABSTRACT

The present invention relates generally to nonwoven materials, and specifically, to a nonwoven fabric comprised of at least two continuous filament precursor webs, each precursor web being of a polyolefin polymer dissimilar from that of the other precursor web, wherein the resulting lightweight nonwoven laminate fabric exhibits improved tactile and ductile qualities, the nonwoven fabric being imminently suitable for application in improving the comfort and use of hygiene, medical and industrial products. The lightweight nonwoven fabric is manufactured with a minimum level of processes complexity, and can be either used as a replacement for an existing facing layer, such as a topsheet of a hygiene product, or used in conjunction with an existing construct so as to improve long-term comfort.

2 Claims, 2 Drawing Sheets

U.S. PATENT DOCUMENTS

| | | |
|---|---|---|
| 6,114,017 A | 9/2000 | Fabbricante et al. |
| 6,198,018 B1 | 3/2001 | Curro |
| 6,290,979 B1 | 9/2001 | Roe et al. |
| 6,340,413 B1 | 1/2002 | Nilsson et al. |

* cited by examiner

LIGHTWEIGHT NONWOVEN FABRIC HAVING IMPROVED PERFORMANCE

TECHNICAL FIELD

The present invention relates generally to nonwoven materials, and specifically, to a nonwoven fabric comprised of at least two continuous filament precursor webs, each precursor web being of a polyolefin polymer dissimilar from that of the other precursor web, wherein the resulting lightweight nonwoven laminate fabric exhibits improved tactile and ductile qualities, the nonwoven fabric being eminently suitable for application in improving the comfort and use of hygiene, medical and industrial products.

BACKGROUND OF THE INVENTION

Nonwoven fabrics are used in a wide variety of applications where the engineered qualities of the fabrics can be advantageously employed. The use of selected thermoplastic polymers in the construction of the fibrous fabric component, selected treatment of the fibrous component (either while in fibrous form or in an integrated structure), and selected use of various mechanisms by which the fibrous component is integrated into a useful fabric, are typical variables by which to adjust and alter the performance of the resultant nonwoven fabric.

Disposable hygiene products and personal protective apparel, readily employ nonwoven fabrics in their respective constructions. Such nonwoven fabrics come into intimate contact with the human skin for prolonged periods of time. The comfort of the product is subsequently directly attributed to the way in which the product touches the skin, the weight of the product as it is worn, and the ability of the product to conform and adapt to changes in user position. In acknowledgment of the importance of the product/human interface, conventional nonwoven fabric manufactures have gone to great efforts to improved the tactile and ductile performance of their fabrics.

Two general approaches to improving the comfort of a nonwoven fabric include chemical and mechanical alteration. Representative prior art to the use of chemical alteration of the nonwoven fabric are: U.S. Pat. No. 6,290,979, to Roe et al., teaches to the use of a first and a second skin care composition to effect the comfort of a disposable diaper; and applicants' co-pending application, directed to the use of a two-part fatty acid amide melt additive, involves the introduction of the melt additive into the nonwoven fabric during manufacture. Mechanical alteration has been presented in the prior art in such forms as compressive technologies (MICREXING is described in U.S. Pat. Nos. 3,260,778; 3,416,192; 3,810,280, 4,090,385; and 4,717,329) and alternate nonwoven fabric formation technologies (as typified by U.S. Pat. No. 6,340,413 to Nilsson, et al.).

U.S. Pat. No. 5,766,737, to Willey et al., directed to a multilayered barrier fabric, teaches a nonwoven fabric having differential aesthetic properties obtained by the necessary incorporation of barrier meltblown layer. Such a laminate as taught by Willey et al., includes a significant quantity of meltblown material, and a significant overall laminate basis weight, so as to render the material suitable for independent use in medical applications.

There remains an unmet need for a lightweight, durable nonwoven fabric, which can be used in improving the comfort of hygiene, medical and industrial products, which does not necessarily involve the use of additional additives or complex manufacturing procedures, and which does not adversely affect the performance of the construct or product to which it is adjoined.

SUMMARY OF THE INVENTION

The present invention relates generally to nonwoven materials, and specifically, to a nonwoven fabric comprised of at least two continuous filament precursor webs, each precursor web being of a polyolefin polymer dissimilar from that of the other precursor web, wherein the resulting lightweight nonwoven laminate fabric exhibits improved tactile and ductile qualities, the nonwoven fabric being imminently suitable for application in improving the comfort and use of hygiene, medical and industrial products. The lightweight nonwoven fabric is manufactured with a minimum level of processes complexity, and can be either used as a replacement for an existing facing layer, such as a topsheet of a hygiene product, or used in conjunction with an existing construct so as to improve long-term comfort.

Nonwoven fabrics in accordance with the present invention are formed from a juxtaposition of a first polyolefin precursor web, preferably of continuous filaments, and a second polyolefin precursor web, also preferably of continuous filaments. The polyolefin polymers of the continuous filament precursor webs are chosen from the group consisting of polypropylene, polyethylene, and the derivatives and/or the combinations thereof. Further, the first and second precursor webs of the lightweight facing fabric may comprise homogeneous, bicomponent, and/or multi-component profiles, as well as, performance and/or aesthetic modifying additives, and the blends thereof.

It is within the purview of the present invention that a fabric formed can optionally include one or more intermediate adhesion layers comprised of a thermally compatible thermoplastic that allows for the adjoining of the two dissimilar polyolefin precursor webs. The resulting nonwoven facing fabric is one that has improved tactile and ductile qualities, while being lightweight and durable, so as to enhance the comfort of hygiene, medical, and industrial applications end-use articles.

Other features and advantages of the present invention will become readily apparent from the following detailed description, the accompanying drawings, and the appended claims.

DETAILED DESCRIPTION

Figure 1:
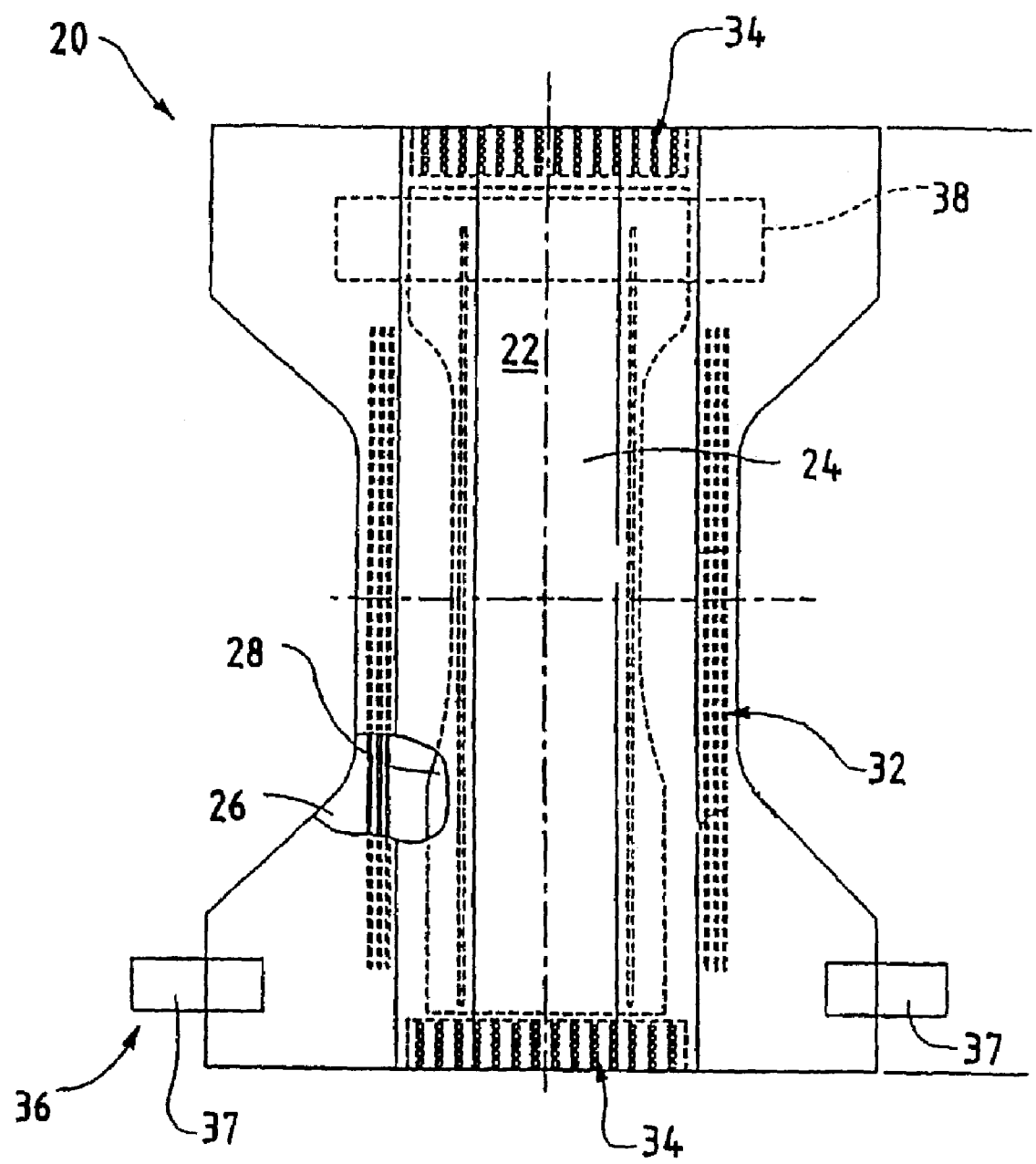
FIG. 1 illustrates a plan view of a diaper.

While the present invention is susceptible of embodiment in various forms, there will hereinafter be described, presently preferred embodiments, with the understanding that the present disclosure is to be considered as an exemplification of the invention, and is not intended to limit the invention to the specific embodiments disclosed herein.

The present invention is directed to a nonwoven facing fabric, which entails formation of a first layer of polyolefinic continuous filaments, preferably of polypropylene, a second layer of polyolefinic continuous filaments, preferably of polyethylene, and optionally, at least one intermediate thermoplastic adhesion layer. In order to achieve desired lightweight facing properties, each of the first and second continuous filament precursor webs should not exceed a component basis weight of about 12 grams per square meter. Further, so as to not interfere with overall end-use article performance or adversely impact fluid management, such as when used as an alternate material in topsheet manufacture in disposable hygiene products, the component basis weight of the intermediate adhesion layer, when used, should be of about 3 grams per square meter or less.

In general, the formation of continuous filament precursor webs involves the practice of the "spunbond" process. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web.

It is within the purview of the present invention that at least one of the continuous filament precursor webs may be formed from filaments having a nano-denier, as taught in U.S. Pat. Nos. 5,678,379 and 6,114,017, both incorporated herein by reference. Further, at least one of the continuous filament precursor webs may be formed from an intermingling of conventional and nano-denier filaments.

The thermoplastic adhesion layer may be applied by application of suitable technologies, as exemplified by: spunbond, meltblown, nano-denier, or sputter coating, and the combinations thereof. The composition of the thermoplastic adhesion layer is selected from those polymers exhibiting a bonding performance that is compatible with the thermoplastic composition of the first and second continuous filament precursor webs. Representative methods for obtaining such compatibility of the adhesion layer may be achieved through: modification of the thermal history of the polymer through incorporation of reclaimed fiber and/or material; formation of a thermoplastic blend comprising no more that about 20% by weight of the thermoplastic composition of the first continuous filament precursor web in a base matrix of the thermoplastic composition of the second continuous filament precursor web; by the addition of derivatized or alternate-catalyst thermoplastic polymers, tackifiers such as ethylene vinyl acetate, or other such means as to broaden the melt temperature profile of the adhesion layer thermoplastic composition.

A related means to the spunbond process for forming a layer of a nonwoven fabric is the meltblown process. Again, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved. The process to form either a single layer or a multiple-layer fabric is continuous, that is, the process steps are uninterrupted from extrusion of the filaments to form the first layer until the bonded web is wound into a roll. Methods for producing these types of fabrics are described in U.S. Pat. No. 4,043,203. The meltblown process, as well as the cross-sectional profile of the spunbond filament or meltblown microfiber, is not a critical limitation to the practice of the present invention.

The polyolefin precursor webs of dissimilar composition, and the thermoplastic adhesion layer if utilized, are then consolidated, usually by means involving heat and pressure, such as by thermal point or ultrasonic bonding. Using this means, the web or layers of webs are passed between two hot metal rolls, one of which has an embossed pattern to impart and achieve the desired degree of point bonding, usually on the order of 10 to 40 percent of the overall surface area being so bonded.

Manufacture of nonwoven compound fabrics embodying the principles of the present invention includes the use of fibers and/or filaments having different composition. Differing thermoplastic polymers can be compounded with the same or different performance improvement additives. Further, fibers and/or filaments may be blended with fibers and/or filaments that have not been modified by the compounding of additives.

EXAMPLES

Comparative Example 1

A nonwoven fabric was made in accordance with conventional practices known to those skilled in the art. The nonwoven fabric consisted of two layers of polyethylene continuous filament precursor webs, bonded by thermal calendering. The final basis weight was 15 grams per square meter.

Example 1

A nonwoven fabric was made in accordance with the teachings of the present invention. A first continuous filament precursor web was formed from polyethylene as supplied by Nova under reference code 2712. The component basis weight of the polyethylene precursor web was about 5 grams per square meter. A thermoplastic adhesion layer was applied upon the polyethylene precursor web. The thermoplastic adhesion layer comprised meltblown polypropylene, the polypropylene made available by Exxon, under reference code 3546G, and at a component basis weight of about 3 grams per square meter. A second continuous filament precursor web was applied onto the combined first polyethylene continuous filament precursor web and polypropylene thermoplastic adhesion layer. The second continuous filament precursor web comprised of polypropylene as made available by Exxon, under reference code 3155, and at a component basis weight of about 7 grams per square meter. The precursor webs and thermoplastic adhesion layer were consolidated into a nonwoven laminate fabric by application of a thermal calender having a top and bottom roll. The surface temperature of the top roll was 275° F., the surface temperature of the bottom roll was 253° F.

The Comparative Example 1 and Example 1 were evaluated by conventional nonwoven test procedures. The data is provided in Table 1.

Utilizing the above-discussed substrate and lightweight facing layer manufacturing technologies, combinations of different constructs can be combined with a lightweight and durable facing layer to yield compound nonwoven materials of further improved comfort.

A number of end-use articles can benefit from the inclusion or substitution of a pre-existing nonwoven fabric layer with the nano-fiber lightweight facing layer of the present invention, including, but not limited to, hygiene absorbent articles, such as diapers and catamenial products, and medical/industrial protective articles.

Disposable waste-containment garments are generally described in U.S. Pat. Nos. 4,573,986, 5,843,056, and 6,198,018, which are incorporated herein by reference.

An absorbent article incorporating an improved lightweight facing fabric of the present invention is represented by the unitary disposable absorbent article, diaper 20, shown in FIG. 1. As used herein, the term "diaper" refers to an absorbent article generally worn by infants and incontinent persons that is worn about the lower torso of the wearer. It should be understood, however, that the present invention is also applicable to other absorbent articles such as incontinence briefs, incontinence undergarments, diaper holders and liners, feminine hygiene garments, training pants, pull-on garments, and the like.

FIG. 1 is a plan view of a diaper 20 in an uncontracted state (i.e., with elastic induced contraction pulled out) with portions of the structure being cut-away to more clearly show the construction of the diaper 20. As shown in FIG. 1, the diaper 20 preferably comprises a containment assembly 22 comprising a liquid pervious topsheet 24; a liquid impervious backsheet 26 joined to the topsheet; and an absorbent core 28 positioned between the topsheet 24 and the backsheet 26. The absorbent core 28 has a pair of opposing longitudinal edges, an inner surface and an outer surface. The diaper can further comprise elastic leg features 32;

118 and 120 extending from opposed sides of the front panel 116 for covering the back of the wearer. The back panels 118 and 120 have a pair of side edges 122 and 124, respectively, which define an opening on the back of the gown. The gown 112 has a pair of sleeves 126 and 128 secured to the body portion 114 of the gown for the arms of the wearer. In use, the back panels 118 and 120 overlap on the back of the wearer in order to close the back opening of the gown, and suitable belt means (not shown) is utilized to secure the back panels 118 and 120 in the overlapping relationship.

From the foregoing, numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

TABLE 1

| Sample | MD XDDEL % ELONG @ peak (%) | MD XDDTS TENS @ peak (g/cm) | MD XDDTEAS TEA (cm*g/cm²) | MD XDDT2YS TENS @ 2% yield (g/cm) | CD XDDEL % ELONG @ peak (%) | CD XDDTS TENS @ peak (g/cm) | CD XDDTEAS TEA (cm*g/cm²) | CD XDDT2YS TENS @ 2% yield (g/cm) |
|---|---|---|---|---|---|---|---|---|
| Comparative Example 1 | 156.14 | 283.53 | 389.52 | 127.95 | 128.54 | 121.45 | 129.12 | 29.91 |
| Example 1 | 37.51 | 339.07 | 122.4 | 188.41 | 50.93 | 176.28 | 75.07 | 62.4 | elastic waist features 34; and a fastening system 36, which preferably comprises a pair of securement members 37 and a landing member 38.

Practical application of an improved lightweight and durable facing fabric comprising a lightweight facing layer as described in this invention for topsheet 24 results in a diaper that is lighter in weight while maintaining performance. A lighter weight material with improved tactile and ductile qualities is expected to be more flexible and therefore more conforming to deformation of the overall structure as the diaper is applied and worn.

Catamenial products, such as feminine hygiene pads, are of the same general construction as the aforementioned diaper structure. Again, a topsheet and a backsheet are affixed about a central absorbent core. The overall design of the catamenial product is altered to best conform to the human shape and for absorbing human exudates. Representative prior art to such article fabrication include U.S. Pat. Nos. 4,029,101, 4,184,498, 4,195,634, 4,408,357 and 4,886,513, which are together incorporated herein by reference.

Medical and industrial protective products, such as CSR, medical gown, surgical drape and oversuits can benefit significantly from the inclusion of an improved lightweight facing fabric as described in the present invention. Of particular utility in the fabrication of such protective products is the use of lighter weight and improved comfort fabrics will allow for finished product to be as lightweight as possible and yet still perform the desired function. Patents generally describing such protective products include U.S. Pat. Nos. 4,845,779, 4,876,746, 5,655,374, 6,029,274, and 6,103,647, which are together incorporated herein by reference.

Figure 2:
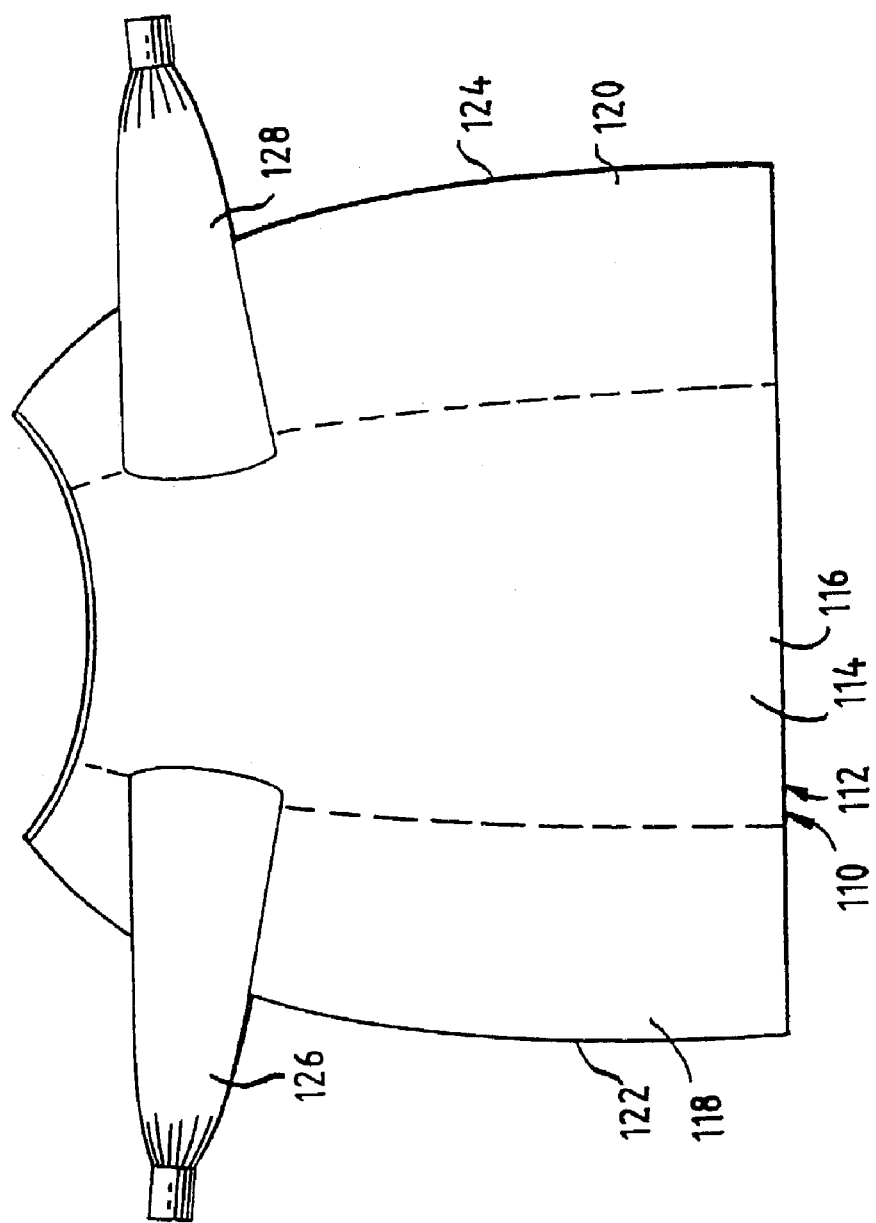
FIG. 2 illustrates a disposable surgical gown.

Referring now to FIG. 2, there is shown a disposable garment generally designated 110 comprising a surgical gown 112. The gown 112 comprises a body portion 114, which may be one-piece, having a front panel 116 for covering the front of the wearer, and a pair of back panels

What is claimed is:

1. A method for forming a nonwoven laminate fabric, comprising the steps of:
   a. providing a first polyolefin polymer,
   b. providing a second polyolefin polymer, wherein said second polyolefin polymer is dissimilar to said first polyolefin polymer,
   c. forming said first polyolefin polymer into a first continuous filament precursor web having a basis weight of no more than about 12 grams per square meter,
   d. forming said second polyolefin polymer into a second continuous filament precursor web having a basis weight of no more than about 12 grams per square meter, wherein said second continuous filament precursor web is formed on the surface of said first continuous filament precursor web, and
   e. consolidating said first and said second continuous filament precursor web by application of elevated temperature and pressure to form a nonwoven laminate fabric;

including providing a thermoplastic polymer, in the form of meltblown fibers, exhibiting a melt temperature profile that is compatible with the thermoplastic composition of the first and second polyolefin polymers, and applying said thermoplastic polymer onto said first continuous filament precursor web at a component basis weight level of no more than about 3 grams per square meter to form a thermoplastic adhesion layer.

2. A method for forming a nonwoven laminate fabric, comprising the steps of;
   a. providing a first polyolefin polymer,
   b. providing a second polyolefin polymer, wherein said second polyolefin polymer is dissimilar to said first polyolefin polymer, c. forming said first polyolefin polymer into a first continuous filament precursor web having a basis weight of no more than about 12 grams per square meter;
d. forming said second polyolefin polymer into a second continuous filament precursor web having a basis weight of no more than about 12 grams per square meter,
e. juxtaposing said first continuous filament precursor web and said second continuous filament precursor web in face to face relationship, and
f. consolidating said first and said second continuous filament precursor web by application of elevated temperature and pressure to form a nonwoven laminate fabric;

including providing a thermoplastic polymer, in the form of meltblown fibers, exhibiting a melt temperature profile that is compatible with the thermoplastic composition of the first and second polyolefin polymers, and applying said thermoplastic polymer onto said first continuous filament precursor web at a component basis weight level of no more than about 3 grams per square meter to form a thermoplastic adhesion layer.

said juxtaposing step including juxtaposing said combined first continuous filament precursor web and thermoplastic adhesion layer with said second continuous filament precursor web in face to face relationship.

* * * * *